Patented Aug. 19, 1952

2,607,782

UNITED STATES PATENT OFFICE 2,607,782

PROCESS FOR THE PRODUCTION OF 1:4:5:8 TETRAAMINO-ANTHRAQUINONE

George W. Seymour, Maplewood, and Victor S. Salvin, Summit, N. J., assignors to Celanese Corporation of America, a corporation of Delaware No Drawing. Application September 30, 1947, Serial No. 777,120

6 Claims. (Cl. 260—378)

This invention relates to the preparation of anthraquinone dyestuffs and relates more particularly to an improved process for the production of 1:4:5:8-tetraamino-anthraquinone.

An object of this invention is the provision of an improved process for the production of 1:4:5:8-tetraamino-anthraquinone whereby said dyestuff may be obtained in increased purity and yield.

Another object of this invention is to provide an improved process for the production of 1:4:5:8-tetraamino-anthraquinone which is capable of yielding dyeings on cellulose acetate or other organic derivative of cellulose materials in blue shades of increased light fastness and possessing a neutral change in shade under artificial light.

Other objects of this invention will appear from the following detailed description.

The anthraquinone dyestuff 1:4:5:8-tetraamino-anthroquinone, as heretofore obtained, has been found to dye cellulose acetate or other organic derivative of cellulose materials in rather dull, reddish-blue shades which are not only lacking in light fastness but, in addition, exhibit an undesirable change in shade when viewed under artificial light. The dyestuff has been obtained by a sequence of steps involving the nitration of anthraquinone to a mixture of 1:5- and 1:8-dinitro-anthraquinone, reduction of the nitro groups to the corresponding 1:5- and 1:8-diamino compounds, acetylation to protect the free amino groups, followed by nitration, reduction and hydrolysis of the acetylated 1:5- and 1:8-diamino-anthraquinone isomers to yield the desired 1:4:5:8-tetraamino-anthraquinone. The undesirable characteristics of the dyestuff obtained by this process appear to be due primarily to incomplete nitration and amination of the mixed acetylated 1:5- and 1:8-diamino-anthraquinone product with the result that the 1:4:5:8-tetraamino-anthraquinone finally obtained contains an appreciable quantity of tri-amino-anthroquinone. Partial methylation of the final aminated product has been suggested as a means of brightening the shade and shifting the color from the reddish-blue shade obtained to one which is a more greenish-blue but the partially methylated amino-anthraquinone dyestuff, while somewhat more acceptable, still is not entirely satisfactory.

We have now found that 1:4:5:8-tetraamino-anthraquinone substantially free of triamino-anthraquinone and of notably improved dyeing properties may be obtained if the nitration of the mixture of acetylated 1:5- and 1:8-diamino-anthraquinone employed during the preparation of said dyestuff is effected at a reaction temperature of from 10 to 20° C. in solution in a substantial excess of sulfuric acid. By effecting the nitration at a temperature of 10 to 20° C. substantially complete nitration of the acetylated 1:5- and 1:8-diamino-anthraquinone in the free para-positions is achieved. Upon subsequent reduction of the di-nitrated acetylated-diamino intermediate followed by hydrolysis of the acetyl groups, 1:4:5:8-tetraamino - anthraquinone of excellent dyeing properties is obtained. The use of an excess of sulfuric acid, preferably, in an amount of from 5 to 8 parts by weight on the weight of the mixture of acetylated 1:5- and 1:8-diamino-anthraquinone, acts to inhibit any precipitation of the dinitro-diacetylamino-anthraquinone formed. Where excess sulfuric acid is present, precipitation of the nitrated product formed during the nitration reaction is minimized and, therefore, the occlusion of any incompletely nitrated product in such precipitate is avoided. Since such precipitation is avoided any incompletely nitrated product is retained in solution for a sufficient period to complete the nitration.

Thus, in accordance with our novel process, the mixture of acetylated 1:5- and 1:8-diamino-anthraquinone to be nitrated is dissolved in from 5 to 8 parts by weight of concentrated, i. e. 96%, sulfuric acid on the weight of the anthraquinone compound at a temperature of 10 to 15° C. and then 2 to 2.5 parts by weight of a mixture of 96% sulfuric acid and 65% nitric acid containing 0.5 to 0.75 part by weight of nitric acid on the weight of the intermediate are slowly added thereto over about one hour. The temperature of the reaction mixture is then raised slightly to about 16 to 20° C., usually to about 18° C., and maintained at this temperature for 2 to 4 hours to complete the nitration. The nitrated product is precipitated from solution by drowning the nitration melt in a mixture of ice and water and the precipitated dinitro-acetylated 1:5- and 1:8-diamino-anthraquinone is then filtered off and washed free of acid. Nitration in accordance with our process yields a substantially completely di-nitrated product.

Reduction of the dinitro-acetylated 1:5- and 1:8-diamino-anthraquinone to diamino-1:5 and 1:8-diacetylamino-anthraquinone, prior to hydrolysis of the acetyl groups, is effected in aqueous suspension employing sodium sulfide as the reducing agent. Reduction is first effected at a temperature of about 20° C. for about 1 to 2 hours to reduce the nitro groups present to hydroxylamine groups. The temperature of the aqueous suspension is then raised over about 1 to 3 hours to 75 to 85° C. and is maintained at said temperature for about 2 to 4 hours to complete the reduction of the nitro groups to the desired amino groups. The reduction product is then filtered off and washed free of alkali soluble impurities.

The hydrolysis or de-acetylation of the diamino - 1:5- and 1:8 - di - acetylamino - anthraquinone to 1:4:5:8-tetraamino-anthraquinone is effected by dissolving the acetylated compound in concentrated, i. e. 90%, sulfuric acid and warming the solution at 80 to 90° C. for about 1 to 2 hours. The acetyl groups are split off and the 1:4:5:8-tetraamino-anthraquinone is precipitated by drowning the sulfuric acid solution in a mixture of ice and water. The precipitated 1:4:5:8 - tetraamino - anthraquinone is filtered from the supernatant liquid and washed free of acid. The anthraquinone dyestuff thus obtained dyes cellulose acetate or other organic derivative of cellulose materials in very desirable blue shades of good fastness properties having a neutral change in shade under artificial light. No partial methylation of the dyestuff is required in order to render the dyestuff commercially satisfactory.

In order further to illustrate our invention but without being limited thereto, the following example is given:

Example 208 parts by weight of anthraquinone are dissolved in 2000 parts by weight of concentrated, 96% sulfuric acid at 20 to 25° C. and then 470 parts by weight of mixed acid containing 240 parts by weight of 65% nitric acid and 230 parts by weight of 96% sulfuric acid are added slowly over 2 hours. The temperature rises to 80° C. due to the exothermic nature of the reaction and the mixture is then warmed to 95° C. for 2 hours to complete the nitration. After cooling the nitration mixture to 25° C., the dinitro-anthraquinone formed is precipitated from solution by drowning in a mixture of ice and water. The yellow dinitroanthraquinone which precipitates is filtered and then washed free of acid. About 295 parts by weight of a mixture of 1:5- and 1:8-dinitroanthraquinone is obtained. The acid-free wet press cake of 1:5 and 1:8-dinitro-anthraquinone is then slurried into about 3000 parts by weight of water and a solution of 350 parts by weight of sodium sulfide dissolved in 1000 parts by weight of water is added to the suspension at 25° C. The slurry is stirred for 1 hour at 20 to 30° C. and the temperature is then raised over about 1 hour to 85° C. and held at this temperature for 2 hours to complete the reduction of the dinitro compound to the corresponding diamino-anthraquinone. The suspended 1:5- and 1:8-diamino-anthraquinone is filtered off and washed thoroughly with water, about 200 parts by weight being obtained on drying. The product is then suspended in a mixture of 400 parts by weight of acetic acid and 400 parts by weight of acetic anhydride and held at 130° C. for 3 hours during which time the solution changes from a bright red to a yellow color, indicating the completion of the acetylation reaction. The solution is then dropped on to a mixture of ice and water and the mixture of acetylated 1:5 and 1:8 - diamino - anthraquinone precipitates as a yellow solid. About 260 parts by weight of the acetylated mixture are obtained.

150 parts by weight of mixed acetylated 1:5- and 1:8-diamino-anthraquinone are dissolved at 10 to 15° C. in 1000 parts by weight of concentrated 96% sulfuric acid and then 400 parts by weight of mixed acid containing 150 parts by weight of 65% nitric acid and 250 parts by weight of 96% sulfuric acid are added slowly over about 1 hour at a temperature of 12 to 15° C. The temperature is then raised to 18° C. for 4 hours after which the nitration melt is drowned in 5000 parts by weight of a mixture of ice and water causing the yellow dinitro-acetylated 1:5- and 1:8-diamino-anthraquinone to precipitate. The yellow-solid is filtered off and washed free of acid. The wet press cake of dinitro-acetylated 1:5- and 1:8-diamino-anthraquinone is slurried into 2000 parts by weight of water and a solution of 250 parts by weight of sodium sulfide in 700 parts by weight of water is added to the slurry at 25° C. The mixture obtained is then stirred at 25° C. for 1 hour to reduce the nitro groups to hydroxylamine groups, the reduction of said groups being indicated by the formation of a green-blue color. The temperature is then raised to 75° C. over 1 hour and then held between 75 and 80° C. for 2 hours to complete the reduction to the desired amino groups. The reduction product is then filtered off from the warm suspension and washed thoroughly with water until all of the alkaline water-soluble impurities are washed out. The wet press cake is added to 400 parts by weight of concentrated 90% sulfuric acid and the solution obtained is warmed at 90° C. for 1 hour to effect the hydrolysis or de-acetylation of the acetylamino groups. On drowning the sulfuric acid hydrolysis mixture in 1500 parts of a mixture of ice and water, 1:4:5:8-tetra-amino-anthraquinone precipitates from solution. The 1:4:5:8-tetraamino-anthraquinone is then filtered off and washed free of acid with water. A 70% by weight yield of 1:4:5:8 - tetraamino- based on the mixed diacetylamino-anthraquinones is obtained. The dyestuff dyes cellulose acetate or other organic derivative of cellulose textile materials, for example, a blue shade of good light fastness having a neutral change in shade when exposed to artificial light. The dyestuff is commercially satisfactory in the form obtained and no partial methylation is necessary to render it commercially acceptable.

It is to be understood that the foregoing detailed description is given merely by way of illustration and that many variations may be made therein without departing from the spirit of our invention.

Having described our invention, what we desire to secure by Letters Patent is:

1. In a process for the production of 1:4:5:8-tetraamino - anthraquinone substantially free from triamino-anthraquinone, which includes nitrating a mixture of acetylated 1:5- and 1:8-diamino-anthraquinone, reducing the added nitro groups, and then hydrolyzing the acetylamino groups to form free amino groups, the step which comprises effecting the nitration of the mixed acetylated 1:5- and 1:8-diamino-anthraquinone at a temperature of from 10 to 20° C. in a solution containing a total of 6.0 to 9.6 parts by weight of 100% sulfuric acid and about 0.6 part by weight of nitric acid on the weight of the anthraquinone compound.

2. In a process for the production of 1:4:5:8-tetraamino - anthraquinone substantially free from triamino-anthraquinone which includes nitrating a mixture of acetylated 1:5- and 1:8- diamino-anthraquinone, reducing the added nitro groups, and then hydrolyzing the acetylamino groups to form free amino groups, the step which comprises effecting the nitration of the mixed acetylated 1:5 and 1:8-diamino-anthraquinone at a temperature of from 10 to 20° C. in a solution containing a total of 6.0 to 9.6 parts by weight of 100% sulfuric acid and about 0.6 part by weight of nitric acid on the weight of the anthraquinone compound and precipitating dinitro-acetylated 1:5- and 1:8-diamino-anthraquinone from solution by drowning the nitration melt in a mixture of ice and water.

3. Process for the production of 1:4:5:8-tetraamino-anthraquinone substantially free from triamino-anthraquinone which comprises nitrating a mixture of acetylated 1:5- and 1:8-diamino-anthraquinone at a temperature of from 10 to 20° C. in a solution containing a total of 6.0 to 9.6 parts by weight of 100% sulfuric acid and about 0.6 part by weight of nitric acid on the weight of the anthraquinone compound, precipitating the dinitro-acetylated 1:5- and 1:8-diamino-anthraquinone from solution by drowning the nitration melt in a mixture of ice and water, reducing the nitro groups and hydrolyzing the acetylamino groups to yield 1:4:5:8-tetraamino-anthraquinone.

4. Process for the production of 1:4:5:8-tetraamino-anthraquinone substantially free from triamino-anthraquinone, which comprises nitrating a mixture of acetylated 1:5- and 1:8-diamino-anthraquinone at a temperature of from 10 to 20° C. in a solution containing a total of 6.0 to 9.6 parts by weight of 100% sulfuric acid and about 0.6 part by weight of nitric acid on the weight of the anthraquinone compound, precipitating the dinitro-acetylated 1:5- and 1:8-diamino-anthraquinone from solution by drowning the nitration melt in a mixture of ice and water, reducing the nitro groups of the dinitro-acetylated 1:5- and 1:8-diamino-anthraquinone with sodium sulfide while in aqueous suspension and hydrolyzing the acetylamino groups with concentrated sulfuric acid to yield 1:4:5:8-tetraamino-anthraquinone.

5. Process for the production of 1:4:5:8-tetraamino-anthraquinone substantially free from triamino-anthraquinone, which comprises nitrating a mixture of acetylated 1:5- and 1:8-diamino-anthraquinone at a temperature of from 10 to 20° C. in a solution containing a total of 6.0 to 9.6 parts by weight of 100% sulfuric acid and about 0.6 part by weight of nitric acid on the weight of the anthraquinone compound, precipitating the dinitro-acetylated 1:5- and 1:8-diamino-anthraquinone from solution by drowning the nitration melt in a mixture of ice and water, reducing the nitro groups of the dinitro-acetylated 1:5- and 1:8-diamino-anthraquinone to hydroxylamine groups with sodium sulfide while in aqueous suspension at 25° C., raising the temperature to 75 to 85° C. to complete the reduction and hydrolyzing the acetylamino groups with concentrated sulfuric acid to yield 1:4:5:8-tetraamino-anthraquinone.

6. Process for the production of 1:4:5:8-tetraamino-anthraquinone substantially free from triamino-anthraquinone, which comprises nitrating a mixture of acetylated 1:5- and 1:8-diamino-anthraquinone at a temperature of from 10 to 20° C. in a solution containing a total of 8 parts by weight of 100% sulfuric acid and about 0.6 part by weight of nitric acid on the weight of the anthraquinone compound, precipitating the dinitro-acetylated 1:5- and 1:8-diamino-anthraquinone from solution by drowning the nitration melt in a mixture of ice and water, reducing the nitro groups of the dinitro-acetylated 1:5- and 1:8-diamino-anthraquinone to hydroxylamine groups with sodium sulfide while in aqueous suspension at 25° C., raising the temperature to 75 to 85° C. to complete the reduction and hydrolyzing the acetylamino groups with concentrated sulfuric acid to yield 1:4:5:8-tetraamino-anthraquinone.

GEORGE W. SEYMOUR.
VICTOR S. SALVIN.

REFERENCES CITED

The following references are of record in the file of this patent:

UNITED STATES PATENTS

| Number | Name | Date |
|---|---|---|
| 2,309,708 | Olpin et al. | Feb. 2, 1943 |

FOREIGN PATENTS

| Number | Country | Date |
|---|---|---|
| 127,780 | Germany | Jan. 17, 1902 |
| 143,804 | Germany | July 27, 1903 |